April 17, 1951     E. A. WILHELM     2,549,652
UNIVERSAL GEAR CASE FOR ROTARY PUMPS Filed June 20, 1947     6 Sheets-Sheet 1

Inventor
Edward A. Wilhelm
By Robert M. Dunning
Attorney

April 17, 1951  E. A. WILHELM  2,549,652
UNIVERSAL GEAR CASE FOR ROTARY PUMPS
Filed June 20, 1947  6 Sheets-Sheet 2

Inventor
Edward A. Wilhelm
By Robert M. Dunning
Attorney

April 17, 1951 E. A. WILHELM 2,549,652
UNIVERSAL GEAR CASE FOR ROTARY PUMPS
Filed June 20, 1947 6 Sheets-Sheet 3

Inventor
Edward A. Wilhelm
By Robert M. Dunning
Attorney

April 17, 1951 E. A. WILHELM 2,549,652
UNIVERSAL GEAR CASE FOR ROTARY PUMPS
Filed June 20, 1947 6 Sheets-Sheet 5

Inventor
Edward A. Wilhelm
By Robert M. Dunning
Attorney

April 17, 1951  E. A. WILHELM  2,549,652
UNIVERSAL GEAR CASE FOR ROTARY PUMPS
Filed June 20, 1947  6 Sheets-Sheet 6

Inventor
Edward A. Wilhelm
By Robert M. Dunning
Attorney

Patented Apr. 17, 1951

2,549,652

UNITED STATES PATENT OFFICE 2,549,652

UNIVERSAL GEAR CASE FOR ROTARY PUMPS

Edward A. Wilhelm, St. Paul, Minn., assignor to Waterous Company, St. Paul, Minn., a corporation of Minnesota Application June 20, 1947, Serial No. 755,832

4 Claims. (Cl. 74—606)

The present invention relates to an improvement in a universal gear case for a rotary pump wherein it is desired to provide a gear case which will support a pump drive shaft in selected position.

Rotary pumps are usually provided with a pair of projecting shafts bearing meshing gears which cause rotation of the rotors in unison. One of the rotor shafts projects beyond the other to accommodate a driving gear. This gear is rotated by a pinion supported by a pinion drive shaft mounted on the gear casing. The position of this pinion drive shaft varies depending upon the pump installation, sometimes being positioned above the drive gear or below the same and sometimes being positioned on one side or the other of this drive gear. The design of the gear casing has usually been varied to fit the particular installation for which the pump is intended. As a result numerous patterns for different types of gear casings were required to fit various installations.

The source of driving power for the rotor sometimes is arranged to rotate in a clockwise direction and at other times is arranged to rotate in a counter-clockwise direction. As the pump rotors must always rotate in the same direction, it has been common practice to reverse the relation of the pump rotors to position the driving gear on one rotor shaft when the driving force operated in a clockwise direction and to position the drive gear on the other rotor shaft when the driving force rotated in a counter-clockwise direction. This arrangement also required changes in the gear housing to compensate for variations in the direction of rotation of the driving force.

It is the object of the present invention to provide a universal gear case capable of supporting a drive pinion shaft in any of a series of selected positions and to be operable to properly support the driving pinion regardless of the direction of rotation of the driving force. As a result a single gear casing may serve in a great number of different types of installations, thus cutting down the number of patterns and castings necessary to serve an intended purpose.

A feature of the present invention resides in the provision of a gear casing which is reversible so as to enclose a drive gear mounted on either of the rotor shafts. Thus if the driving force rotates in a clockwise direction the gear case may be mounted in one position upon the pump, while if the driving force rotates in a counter-clockwise direction, the casing may be reversed in its position upon the pump.

A feature of the present invention resides in the provision of a gear casing having a series of bosses thereon, any of which may be drilled out to accommodate a pinion drive shaft. Accordingly in order to fit the requirements of a predetermined installation, it is only necessary to know the direction of rotation of the driving force and the desired position of the drive pinion shaft. By drilling through the proper bosses in the casing, the drive pinion may be supported in proper relation.

A feature of the present invention resides in the provision of a gear casing which may be inverted if desired without changing the construction thereof. When the casing is arranged in one position, the angularly spaced bosses are properly arranged to support a pinion drive shaft for rotation in a clockwise direction. When in inverted position the bosses are properly arranged to support a pinion drive shaft for counter-clockwise rotation.

A further feature of the present invention resides in the provision of a casing designed to accommodate a rotor shaft and in the provision of a series of bosses arranged in angularly spaced relation about the center of this shaft. The bosses are arranged at equal distance from the center of the shaft so as to accommodate a pinion drive shaft.

These and other objects and novel features of the present invention will be more clearly and fully set forth in the following specification and claims.

In the drawings forming a part of the specification:

Figure 1:
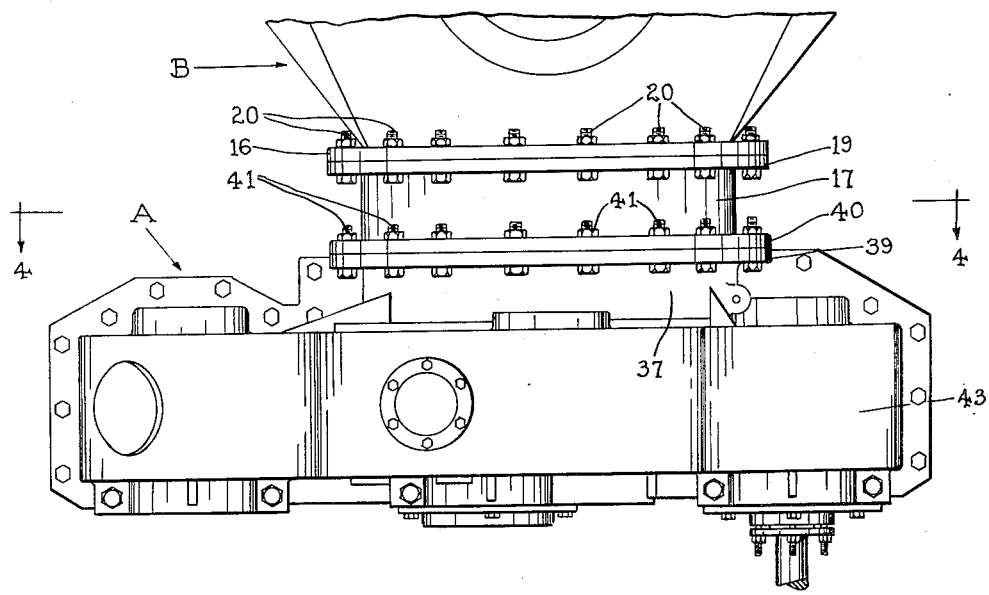
Figure 1 is a top plan view of a portion of a rotary pump and a gear casing connected thereto.

The gear casing A is designed for use in conjunction with a rotary pump B, the particular construction of which is not important in the present invention. The pump B is not shown in detail in the drawings, but includes a pump casing 10 having interlocking cylinder chambers 11 accommodating lobed interlocking rotors 12 and 13. The rotor 12 is supported by a rotor shaft 14 which projects from the ends of the rotor 12. The rotor 13 is similarly supported by a shaft 15.

The pump casing 10 is provided with an oval flange 16 at one end of the rotors. A shaft supporting block 17 is provided with an oval flange 19 lying adjacent the pump housing flange 16 and the flanges 16 and 19 are held together by bolts 20 or other suitable means. Sealing means 21 and 22 within the block 17 encircle the shafts 14 and 15, respectively and bearings 23 and 24 are likewise supported by the block 17 for accommodation of the shafts 14 and 15.

The shafts 14 and 15 project beyond the bearings 23 and 24 to accommodate meshing pinions 26 and 27, respectively. The shaft 15 is provided with a nut 29 engaging the threaded end of the shaft 15 to hold the gear 27 in place The shaft 14 projects beyond the pinion 26 to accommodate the drive gear 30. The drive gear is held in place by means of a lock nut 31 or any other suitable means.

Figure 6:
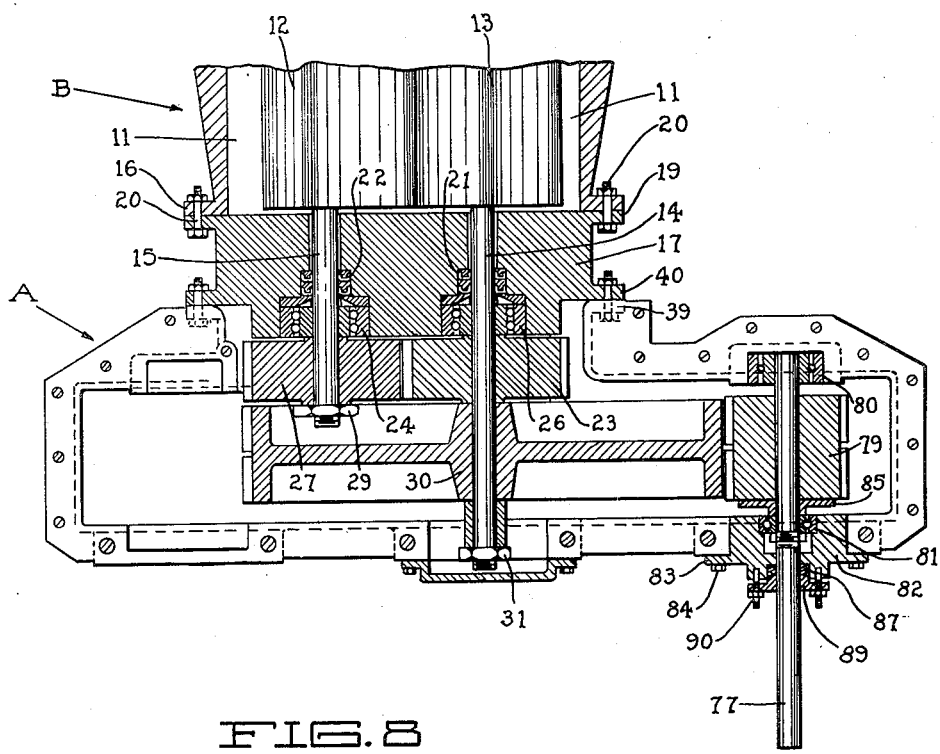
Figure 6 is a sectional view through a portion of the pump and gear casing showing the drive gear supported upon a different rotor shaft from that illustrated in Figure 2.

The gear casing A is so designed that it may be inverted if desired so that either of the rotors may support the drive gear 30. The arrangement of the casing A when in inverted position is illustrated in Figure 6 and will be later described.

The gear casing A includes a pair of castings 32 and 33 which are connected along a horizontal meeting line. A marginal flange 34 is provided upon the section 32 of the housing and a similar peripheral flange 35 is provided upon the casing section 33. The two casing sections are held together by bolts 36 or other suitable means.

The gear casing includes a throat 37 having a peripheral flange 39 thereupon which is of generally oval outline. The flange 39 is designed to engage against a similarly shaped flange 40 on the casting 17. The flanges 39 and 40 are connected together by bolts 41 or other suitable means. The throat 37 forms an enclosure for the meshing pinions 26 and 27 mounted upon the shafts 14 and 15.

The castings 32 and 33 are virtually similar in form, one being the reverse of the other. The housing casting 32 is provided with an inner wall 42 connected to the throat, a forward wall 43 forming the outer closure of the casing, and a marginal connecting wall 44 best illustrated in Figures 1 and 3 of the drawings. The casting 32 is not symmetrical as the bosses therein for supporting the drive pinion shaft are arranged at equal radius from the center of the drive gear 30 which is mounted on one of the rotor shafts, and is therefore not at the center of the casing.

Figure 3:
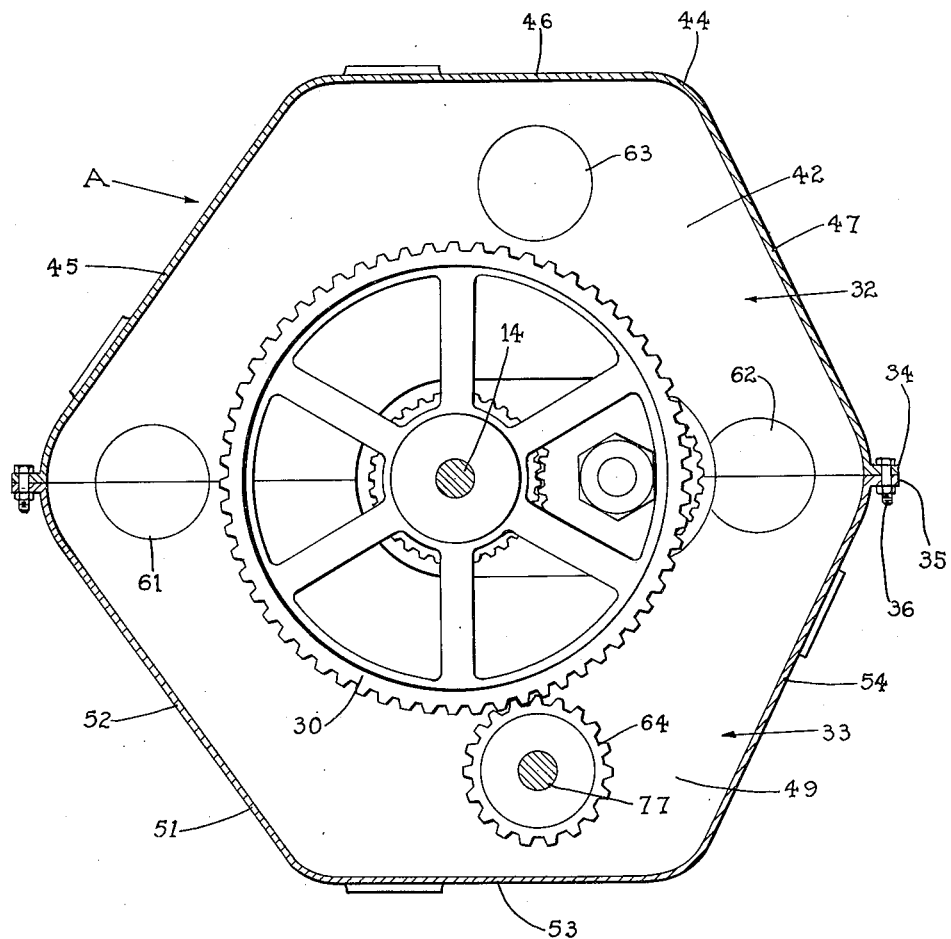
Figure 3 is a vertical sectional view through the casing showing the pinion drive shaft located in a different position from that shown in Figures 1 and 2.
Figure 4:
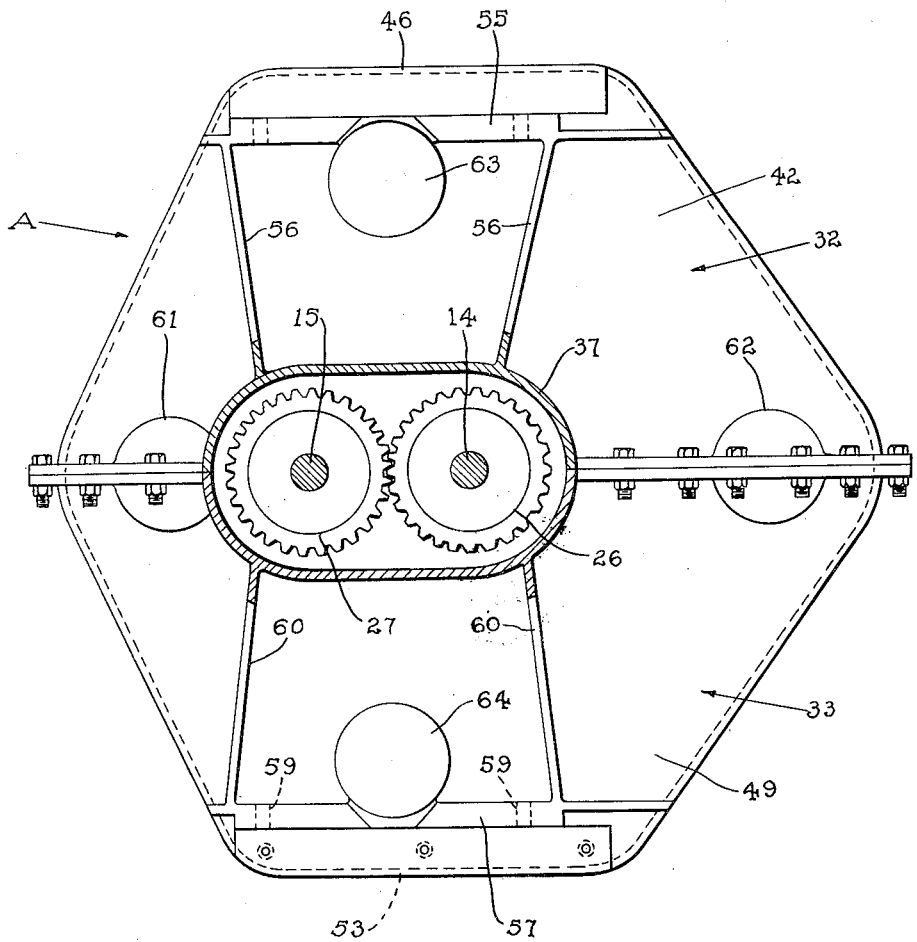
Figure 4 is a sectional view through the throat of the gear casing, the position of the section being indicated by the line 4—4 of Figure 1.
Figure 5:
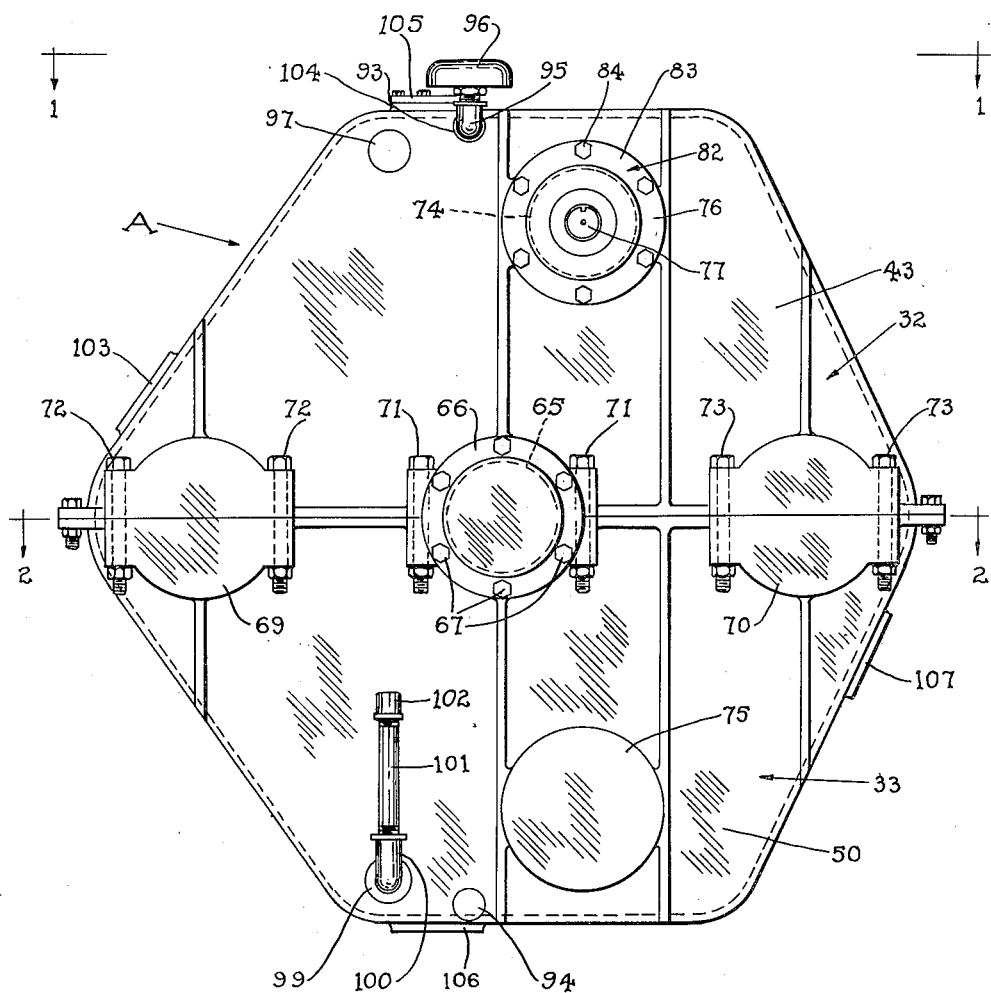
Figure 5 is a front elevational view of the gear casing showing the construction thereof with the pinion drive shaft in a different position from that shown in Figures 2 and 3.

As best illustrated in Figures 3, 4, and 5 of the drawings the marginal connecting wall 42 includes an upwardly inclined wall portion 45, a substantially horizontal top portion 46 and an inclined wall portion 47. The walls 42 and 43 are of course similarly shaped and the particular shape of the wall 44 is arranged to best enclose the drive gear mechanism.

The casting 33 is similar in shape to the casting 32 but is the reverse thereof. The casting 33 includes an inner or rear wall 49, an outer or forward wall 50 and a connecting marginal wall 51. The wall 51 includes a downwardly inclined wall portion 52 in opposed relation to the wall portion 45, a horizontal bottom portion 53 in opposed relation with the wall portion 46 and an inclined wall portion 54 in opposed relation to the wall portion 47.

The rear or inner wall 42 is provided with a transversely extending reinforcing brace 55 thereupon in spaced relation to the horizontal wall 46, this brace serving to reinforce the top of the gear casing and to provide a gear casing support when the pump is in inverted position. A pair of reinforcing ribs 56 extend from the throat 37 to the transverse rib 55 to assist in reinforcing the rear or inner wall 42. A similar reinforcing rib 57 is provided on the casting 33 at a point spaced above the bottom wall 53 of this casting. This rib 57 may serve as a support for the casing and is drilled at 59 to accommodate suitable anchor bolts. Reinforced ribs 60 extend from the rib 57 to the throat 37 to reinforce the rear or inner wall 49 of the casting 33.

A pair of substantially cylindrical hollow bosses 61 and 62 project rearwardly from the rear wall of the housing A on opposite sides of the center of one of the shafts 14 and 15 and equally spaced therefrom. In the position illustrated in Figures 1 through 5 of the drawings the bosses 61 and 62 are positioned with their axes equally spaced from the axis of the shaft 14. A second pair of hollow cylindrical bosses 63 and 64 are likewise provided on the rear wall of the gear housing A above and below the level of the shafts 14 and 15. The axes of the bosses 63 and 64 are arranged on a vertical line positioned mid-way between the chambers 14 and 15 as illustrated. Furthermore the axes of the bosses 63 and 64 are equi-distant from the axes of the shaft 14.

It should be noted that the bosses 61 and 62 are positioned on the meeting line of the casting 32 and 33 and thus one-half of each boss is provided in each casting. However, when the castings are connected together a complete hollow cylindrical boss is provided on each side of the driving gear.

The front wall of the gear housing A is arranged as best illustrated in Figures 1 and 5 of the drawings. A central hollow cylindrical boss 65 is provided in the forward walls 43 and 50 of the housing A, one-half of the boss being located in each casting. A cover plate 66 closes the forward end of the boss 65 and is secured thereto by cap screws 67. A pair of hollow cylindrical bosses 69 and 70 project forwardly from the casing walls 43 and 50, one-half of each boss being formed in each of the castings 32 and 33. The boss 69 is in alignment with the boss 62 on the rear wall of the gear housing, while the boss 70 is in alignment with the boss 61 of the rear wall. Bolts 71 extend through the edges of the boss 65 on either side thereof to hold the casing sections 32 and 33 together at this point. Similar bolts 72 are provided adjacent the boss 69 and bolts 73 are provided adjacent the boss 70. The bolts 71, 72 and 73 connect the forward walls 43 and 50 of the casing sections 32 and 33 together.

A hollow cylindrical boss 74 is provided on the front casing wall 43 in opposed relation to the boss 63 on the rear wall thereof. A similar hollow cylindrical boss 75 is provided on the front casing wall 50 in opposed relation to the boss 64.

Figure 2:
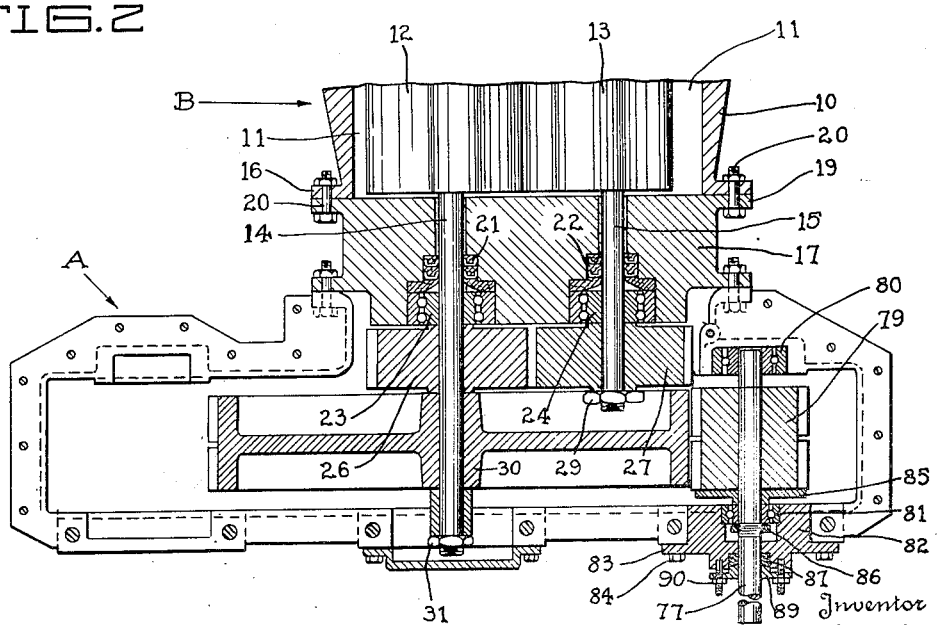
Figure 2 is a sectional view through the gear casing and pump.

Thus all of the bosses on the rear wall are provided with an opposed boss formed in the forward wall of the gear housing so that any of the bosses may serve to support a pinion drive shaft in a manner which will be later described. In the particular construction illustrated in Figure 5 of the drawings the boss 74 has been drilled out and fitted with a cover plate 76 which encloses suitable bearings for supporting the pinion drive shaft 77. In Figures 1 and 2 of the drawings this same pinion drive shaft 77 is shown supported in the boss 70. The particular position of the pinion drive shaft 77 is dependent upon the desired installation and this shaft can be supported in any of the pairs of opposed bosses.

Thus it will be seen from an examination of Figures 3 and 5 of the drawings that the pinion drive shaft 77 may be supported by the opposed bosses 74 and 63, by the opposed bosses 70 and 62, by the opposed bosses 75 and 64, or by the opposed bosses 69 and 61. In any of these positions the pinion 79 on the drive shaft 77 will be supported in mesh with the drive gear 30 on the shaft 14. Thus a pinion drive shaft may be mounted above or below the drive gear, or to either side thereof, depending upon the particular installation.

As best illustrated in Figure 2 of the drawings the pinion drive shaft 77 is supported by a suitable bearing 80 positioned within one of the bosses in the rear or inner wall of the gear casing and also by a bearing 81 supported in a suitable bushing 82 in the opposed boss in the front or forward wall of the gear casing. The bushing 82 is preferably provided with a peripheral flange 83 which is secured to the boss by cap screws 84 or other suitable means. A spacing sleeve 85 is interposed between the pinion 79 and the inner race of the bearing 81 while a lock nut 86 is provided on the shaft 77 externally of the inner race of the bearing 81. Thus the bearing 81 is held from longitudinal movement relative to the bearing. Suitable packing 87 may be provided about the shaft 77 which packing is held in place by a clamping plate 89 attached to the bushing 82 by cap screws 90 or other suitable means.

In adapting the gear casing A to suit any particular drive arrangement it is only necessary to drill out the forward end of the boss through which the pinion drive shaft 77 is to extend. In the construction shown in Figure 5 the forward end of the boss 74 has been drilled out to accommodate the bushing 82. In the similar arrangement shown in Figure 2 of the drawings the forward end of the boss 70 has been drilled out to accommodate the shaft 77. In the arrangement shown in Figure 3 of the drawings the shaft 77 is shown extending through the boss 75. Thus the same castings may be employed regardless of the position of the pinion drive shaft.

Figure 8:
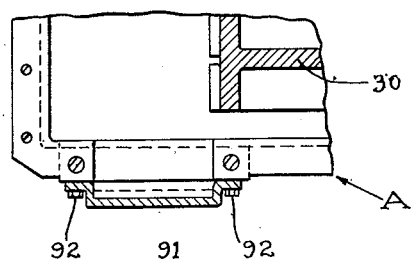
Figure 8 is a sectional view through a detail portion of the casing.

In the modified form of construction illustrated in Figure 8, I disclose a similar construction in which the forward end of each of the bosses 69, 70, 74 and 75 is drilled out to accommodate the pinion drive shaft. In this construction three of the bosses are closed by means of cover plates 91 which are held in place by cap screws 92 or other suitable means. In order to change the position of the pinion drive shaft it is only necessary to remove the bushing 82 supporting this shaft together with the bearings 80 and 81 and in putting this bushing in any selected boss in place of the cover plate 91. The boss previously supporting the pinion drive shaft is then covered by a cover plate 91 to enclose the gear casing. Thus it will be seen that with the construction shown in Figure 8 the pinion drive shaft may be supported in any selected position without changing the casing construction. It will be understood, however, that the position of the pinion drive shaft 77 may be changed in any installation by merely drilling out the supporting boss at the desired point and inserting the bushing 82 therein together with the shaft 77 and its bearings. The opening in the casing caused by the removal of the bushing 82 from its original position may be closed by a cover plate such as 91.

Figure 7:
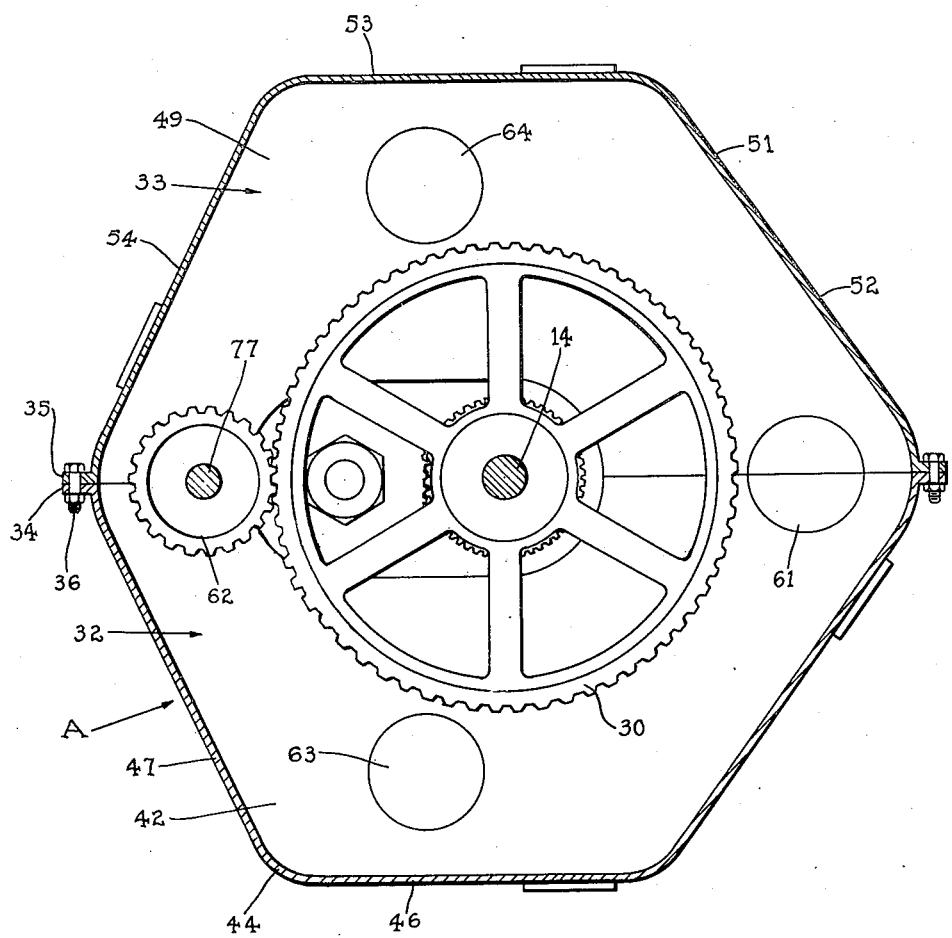
Figure 7 is a view similar to Figure 3 showing the drive pinion shaft supported in a different position relative to the drive gear.

In the foregoing description the gear casing has been described in its position on the pump casting 17 when the rotor shaft 14 acts to support the drive gear 30. In Figures 6 and 7 of the drawings I disclose the arrangement of the parts when the rotors are reversed so that the elongated shaft projects through the casing throat 37 in a different position. In this arrangement the rotors 12 and 13 are actually reversed in position. For the purpose of illustration the shaft 14' is the short shaft, while the shaft 15' is the longer shaft and acts to support the driving gear 30.

In order to compensate for the difference in position of the drive gear 30 the gear casing A is inverted in its entirety. When thus inverted the flange 39 is connected to the flange 40 in inverted position, the flanges being symmetrical to permit such attachment. The various pairs of bosses are accordingly reversed in their relation to the drive gear 30, the bosses 62 and 70 being positioned to the left of the drive gear 30 as viewed from the front of the casing and the bosses 61 and 69 being located to the right of the drive gear 30 as viewed from the front of the casing. Also in this arrangement the bosses 63 and 74 are in inverted position and are arranged near the bottom of the gear casing, while the bosses 64 and 75 are positioned near the top thereof.

As best illustrated in Figure 5 of the drawings a pair of bosses 93 and 94 are arranged in the casing portions 32 and 33 respectively. The boss 93 is drilled to receive elbow 94 connecting the top of the gear casing to the breather cap 96. If desired the boss 94 can be similarly drilled and closed by means of a suitable closure plug. A pair of bosses 97 and 99 project from the forward wall of the gear casing A, the lower boss 99 being drilled to accommodate the elbow 100 leading to the filling pipe 101 closed at its upper end by a cap 102.

The gear casing may be filled to the proper level with lubricant through the pipe 101 when the cap 102 is removed. The boss 97 may be similarly drilled if desired and normally closed by a plug. When the gear casing is inverted as illustrated in Figures 6 and 7 of the drawings, the boss 94 will support the breather cap 96 while the boss 97 will support the filling pipe 101.

The peripheral wall of the casing sections is thickened at predetermined positions to provide inspection openings adjacent the drive pinion. The casing section 32 is provided with a pair of outwardly projecting bosses 103 and 104 adjacent the pairs of transversely aligned bosses designed to support the pinion drive shaft. In the construction shown in Figure 5 of the drawings, the boss 104 is drilled out and closed by means of a closure plate 105 fastened in place by suitable cap screws or the like. Inspection opening bosses 106 and 107 are provided near the transversely aligned pinion drive shaft supporting bosses in the casing section 33. These bosses may be either drilled out to provide an opening at the desired place, or all of the inspection openings may be drilled out and closed by cover plates similar to the plate 105. It will be seen that my gear casing is designed to support the drive shaft in any desired location and to properly enclose the gears regardless of the direction of rotation of the drive means. As a result a single casing may be finished to suit each particular installation in which the pump is located.

In accordance with the patent statutes, I have described the principles of construction and operation of my universal gear case for a centrifugal pump, and while I have endeavored to set forth the best embodiment thereof, I desire to have it understood that obvious changes may be made within the scope of the following claims without departing from the spirit of my invention.

I claim:

1. A universal gear casing for use in conjunction with a rotary pump having a pair of interchangeable rotors, shafts thereupon, and meshing gears on said shafts, one of said shafts projecting beyond the other, the gear casing including a pair of substantially parallel walls and a peripheral connecting wall, a sleeve projecting from one parallel wall of the casing and designed to encircle said meshing gears, said sleeve having parallel spaced walls and rounded ends, one of the rounded ends of the sleeve being concentric with the center of the casing and concentric with one of said shafts, the other rounded end of the sleeve being concentric with the other of the shafts, a flange on the sleeve designed to extend against the casing of the pump, fastening means for connecting said flange to the pump, said fastening means being spaced so that either end of the sleeve can be concentric with either of said shafts, said casing being formed in two parts connected along a line of separation extending longitudinally through said sleeve, a pair of shaft supports in said casing spaced an equal distance from the center of both of said shafts, a second pair of bearing supports spaced equi-distant from the center of one of the shafts and arranged with their axes on the same horizontal plane as said shafts, a shaft supported in one of said bearing supports, a gear on the projecting shaft, and a pinion on the shaft supported by said bearing supports and in mesh with said last named gear.

2. The construction described in claim 1 in which the shaft supported by said bearing supports extends through one of the parallel walls of the casing.

3. The construction described in claim 1 in which the projecting shaft is off-set from the center of the casing and the bearing supports supporting the pinion shaft are one of the first mentioned pair of bearing supports.

4. The construction described in claim 1 and including inspection doors in the peripheral wall of the casing connecting the parallel walls.

EDWARD A. WILHELM.

REFERENCES CITED

The following references are of record in the file of this patent:

UNITED STATES PATENTS

| Number | Name | Date |
| --- | --- | --- |
| 1,401,260 | Iversen | Dec. 27, 1921 |
| 1,599,729 | Taylor | Sept. 14, 1926 |
| 2,028,414 | Schneider | Jan. 21, 1936 |

FOREIGN PATENTS

| Number | Country | Date |
| --- | --- | --- |
| 705,301 | France | June 4, 1931 |